United States Patent [19]
Arnold et al.

[11] 3,875,652
[45] Apr. 8, 1975

[54] METHOD OF BONDING METALS TOGETHER

[75] Inventors: Anthony Francis Arnold, Ringoes; Anthony Zbigniew Miller, Flemington, both of N.J.

[73] Assignee: RCA Corporation, New York, N.Y.

[22] Filed: Aug. 8, 1973

[21] Appl. No.: 386,642

[52] U.S. Cl. .................. 29/470.1; 29/504; 29/488
[51] Int. Cl. ............................................ B23k 21/00
[58] Field of Search ........ 29/470.1, 488, 497.5, 504

[56] References Cited
UNITED STATES PATENTS

| | | | |
|---|---|---|---|
| 2,946,119 | 7/1960 | Jones et al. | 29/470.1 X |
| 3,029,666 | 4/1962 | Lovins | 29/470.1 X |
| 3,384,283 | 5/1968 | Mims | 29/470.1 X |
| 3,662,454 | 5/1972 | Miller | 29/488 X |
| 3,791,028 | 2/1974 | Missel | 29/504 X |

*Primary Examiner*—Francis S. Husar
*Assistant Examiner*—Ronald J. Shore
*Attorney, Agent, or Firm*—H. Christoffersen; A. I. Spechler

[57] ABSTRACT

A wire of a soft metal, such as gold, silver, or copper, can be ultrasonically bonded to a base metal substrate by coating the wire with a thin layer of an alloy of nickel-phosphorus, coating the substrate with a relatively thicker layer of an alloy of cobalt-phosphorus, and applying ultrasonic vibratory energy between the coated wire and the coated substrate. A portion of the thin layer of the nickel-phosphorus is worn away during the application of the ultrasonic vibratory energy, and the wire is bonded directly to the relatively thicker layer of cobalt-phosphorus.

5 Claims, No Drawings

METHOD OF BONDING METALS TOGETHER

This invention relates to a method of bonding metals together, and more particularly to a method of ultrasonically bonding a soft metal body to another metal body. The novel method is particularly useful for ultrasonically bonding a gold wire to a base metal substrate without the necessity of first coating the substrate with a layer of gold to provide a strong ultrasonic bond thereto.

It has been proposed, as described in U.S. Pat. No. 3,662,454, for a "Method of Bonding Metals Together," issued on May 16, 1972, to Anthony Z. Miller, a co-inventor herein, to bond the body of a soft metal to the body of another metal by coating the soft metal with a harder metal and applying ultrasonic vibratory energy between the two bodies. Where the body of the soft metal is gold, such as in a gold wire, and it is desired to ultrasonically bond the gold wire to a base metal substrate, it has been found necessary to apply a coating of gold, silver, palladium-silver, copper, or aluminum on the metal substrate to achieve a good ultrasonic bond of the gold wire thereto. While the method of the aforementioned patent for bonding metals together provides a strong bond between the bonded metals, the necessity for coating the base metal substrate with a layer of the aforementioned metals in the aforementioned example is usually an economic disadvantage in a manufacturing process because of either the cost of these metals (Au, Ag, Pd—Ag), the cost of overcoming corrosion problems (Ag, Au) or the cost and difficulty of applying these metals (Al). In the aforementioned example a layer of gold has been the coating of preference. In accordance with the novel method of the present invention, the body of a soft metal, such as gold, can be securely bonded to a base substrate without the necessity of applying a layer of the aforementioned metals on the substrate. The metal substrates, in accordance with the novel method, can also be metal layers on insulating bodies, as, for example, a sintered molybdenum layer on a ceramic body commonly used in the electronics industry.

Briefly stated, the novel method of bonding a first metal body of a soft metal to a second metal body comprises the steps of (a) placing together said bodies, each coated with a thin layer of an alloy of nickel-phosphorus, cobalt-phosphorus, or mixtures thereof, and (b) applying elastic vibratory energy between the metal bodies.

In a preferred embodiment of the novel method, the first metal body of a soft metal is coated with a relatively thin layer of an alloy of nickel-phosphorus, and the second metal body is coated with a relatively thicker layer of an alloy of cobalt-phosphorus. Both of the alloy layers are then placed together, and ultrasonic vibratory energy is applied to the metal bodies to wear away a portion of the alloy of nickel-phosphorus coating from the first metal body and to provide a bond directly between the soft metal and the alloy layer of cobalt-phosphorus.

The single FIGURE of the drawing is a sectional view of a wire bonded to a substrate of an electrical component in accordance with the method of the present invention.

The novel method of bonding metals together is particularly applicable to the process of bonding a soft metal, such as gold, silver, copper, or alloys thereof, for example, to the smooth surface of another metal. The first metal body can be in the form of a wire, ribbon, or the like, and the second metal body may be a substrate of iron, steel, nickel, copper, and the like, for example, as used in the manufacture of semiconductor devices in the electronic industry.

The first metal body of a soft metal is coated with a relatively thin layer of an alloy, such as nickel-phosphorus, cobalt-phosphorus, or mixtures thereof. The layer of preference for the soft metal body is an alloy of nickel-phosphorus wherein the ratio of nickel to phosphorus is 89% to 11%, by weight. The phosphorus in the nickel-phosphorus alloy may vary, however, from 1% to 30%, by weight.

A suitable plating bath for electroplating a layer of the alloy of nickel-phosphorus on a metal is as follows:

| | |
|---|---|
| $NiSO_4 \cdot 6H_2O$ | 150 g |
| $H_3PO_3$ | 40 g |
| $NiCl_2 \cdot 6H_2O$ | 47 g |
| 85% $H_3PO_4$ | 120 mils |
| Deionized Water to 1 liter | |

The second metal body, which may comprise a substrate of germanium or silicon as well as iron, copper, nickel, or steel, for example, is coated with a relatively thicker coating of an alloy of cobalt-phosphorus, nickel-phosphorus, or mixtures thereof. The alloy of cobalt-phosphorus is preferred on the body of the metal substrate. The ratio of phosphorus to cobalt in the alloy of cobalt-phosphorus may vary between 1 and 30%, by weight, but a ratio of 89% cobalt to 11% phosphorus, by weight, is preferred.

Cobalt-phosphorus can be electrolytically deposited on a metal from the following plating bath:

| | |
|---|---|
| $CoCl_2 \cdot 6H_2O$ | 180 g |
| $H_3PO_4$ | 50 g |
| $H_3PO_3$ | 40 g |
| $CoCO_3$ | 30 g |
| Deionized Water to 1 liter | |

Cobalt-phosphorus may also be deposited on a metal by electroless deposition from the following solution:

| | |
|---|---|
| $CoCL_2 \cdot 6H_2O$ | 30 g |
| Na Hypophosphite | 20 g |
| Sodium citrate ($Na_3C_6H_5O_7 \cdot 5\frac{1}{2} H_2O$) | 35 g |
| $NH_4Cl$ | 50 g |
| $NH_3$ to pH 9–10 | |

Referring now to the drawing, there is shown a first metal body of a soft metal such as a wire 10 of gold, silver, copper, or alloys thereof, for example, ultrasonically bonded to a second metal body, such as a metal substrate 12 of steel, iron, copper, nickel, germanium, silicon or alloys thereof, for example. In accordance with the novel process, the wire 10 is coated with a thin layer 14 of an alloy of nickel-phosphorus, cobalt-phosphorus, or mixtures thereof of the type described supra. The wire 10 may have a thickness of between 0.5 and 20 mils (0.0127 to 0.508mm). When the thickness of the wire 10 is between one and two mils (0.0254 and 0.0508 mm), the thickness of the layer 14 on the wire 10 may vary between 200A and 3,000A, but a thickness of about 350A of the alloy of nickel-phosphorus is preferred. For thicker wires, progressively thicker coatings are desirable.

A smooth surface 16 of the metal substrate 12 is coated with a layer 18 of an alloy of cobalt-phosphorus, nickel-phosphorus, or mixtures thereof, of the type described supra, to a thickness that is relatively greater than the thickness of the layer 14 on the wire 10. The layer 18 of cobalt-phosphorus is the alloy of preference on the harder of the two metal bodies to be ultrasonically bonded together.

The wire 10 is bonded to the metal substrate 12 by applying elastic vibratory (ultrasonic) energy between the wire 10 and the substrate 12, in a manner well-known in the ultrasonic bonding art. During the application of this ultrasonic energy the relatively thin layer 14 on the wire 10 is disrupted in a contact portion 20, where the layer 14 is in contact with the layer 18. Thus, by wearing away the layer 14, the wire 10 comes into intimate contact with the layer 18 of cobalt-phosphorus and adheres to it to form the ultrasonic bond. The layer 14 should be relatively thinner than the layer 18 so that only the layer 14, at the contact portion 20 is worn away from the wire 10, whereby the wire 10 can be bonded directly to the layer 18.

When the wire 10 is of gold, as is preferred in many electronic applications, because of its corrosion resistant properties, and when the present invention is used, the layer 18 (preferably of a cobalt-phosphorus alloy) does not have to be gold to provide a good ultrasonic bond. The bonds provided by the novel method are as good as the bonds provided as disclosed in the aforementioned patent of the prior art, but the present novel method eliminates the requirement of a gold layer on the substrate, thereby providing good ultrasonic bonds at relatively lower costs.

What is claimed is:

1. A method of bonding a first metal body selected from the group consisting of gold, silver, copper, and alloys thereof to a second metal body comprising the steps of:

applying a thin layer of an alloy selected from the group consisting of nickel-phosphorus, cobalt-phosphorus, and mixtures thereof on said first metal body, applying a relatively thicker layer of an alloy selected from the group consisting of cobalt-phosphorus, nickel-phosphorus, and mixtures thereof on said second metal body, placing said layers of said first and said second metal bodies together, and applying elastic vibratory energy between said bodies until said first metal body is bonded to the layer on said second metal body.

2. A method in accordance with claim 1 nickel-phosphorus the layer on said first metal body is a nickel- phosphorus alloy and the layer on said second metal body is a cobalt-phosphorus alloy.

3. A method in accordance with claim 2 wherein:

the layer of said first metal body is between 200A and 3,000A, and the layer on said second metal body is relatively thicker than that on said first body.

4. A method in accordance with claim 1 wherein:

said nickel-phosphorus alloy comprises between 1 and 30%, by weight, of phosphorus, and said cobalt-phosphorus alloy comprises between 1 and 30%, by weight, of phosphorus.

5. A method in accordance with claim 1 wherein:

said first metal body comprises gold and said layer thereon comprises nickel-phosphorus, and said second metal body comprises a base metal and said layer thereon comprises a cobalt-phosphorus alloy.

* * * * *

UNITED STATES PATENT OFFICE
CERTIFICATE OF CORRECTION

PATENT NO. : 3,875,652
DATED : April 8, 1975
INVENTOR(S) : Anthony Francis Arnold et al It is certified that error appears in the above-identified patent and that said Letters Patent are hereby corrected as shown below:

The drawing was omitted in the issued patent. The single figure of the drawing, attached hereto, should be included, as stated in Column 1, lines 61-64.

First page, below the paragraph headed "Abstract", line should read --5 Claims, 1 Drawing Figure --

Claim 2, lines 16-17, delete "nickel-phosphorus" and insert therefor --wherein: --

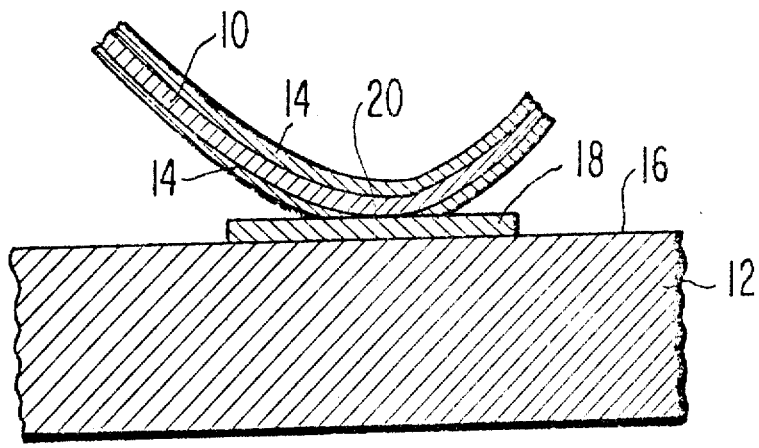

Signed and sealed this 15th day of July 1975.

(SEAL)
Attest:

RUTH C. MASON
Attesting Officer

C. MARSHALL DANN
Commissioner of Patents
and Trademarks